US007806603B2

(12) United States Patent
Izumo et al.

(10) Patent No.: US 7,806,603 B2

(45) Date of Patent: Oct. 5, 2010

(54) OPTICAL POWER SUPPLY TYPE SENSING SYSTEM

(75) Inventors: Masaki Izumo, Tokyo (JP); Tetsuro Wada, Tokyo (JP); Kazuhiro Miyazawa, Tokyo (JP); Kazuhiko Matsuda, Tokyo (JP); Masaki Hattori, Tokyo (JP)

(73) Assignee: The Furukawa Electric Co., Ltd, Tokyo (JP)

( * ) Notice: Subject to any disclaimer, the term of this patent is extended or adjusted under 35 U.S.C. 154(b) by 343 days.

(21) Appl. No.: 11/631,383

(22) PCT Filed: Jul. 1, 2005

(86) PCT No.: PCT/JP2005/012245

§ 371 (c)(1),
(2), (4) Date: Oct. 19, 2007

(87) PCT Pub. No.: WO2006/004061

PCT Pub. Date: Jan. 12, 2006

(65) Prior Publication Data

US 2008/0292243 A1 Nov. 27, 2008

(30) Foreign Application Priority Data

Jul. 2, 2004 (JP) ............................ 2004-196967

(51) Int. Cl.
*G02B 6/36* (2006.01)

(52) U.S. Cl. ........................................................ 385/89

(58) Field of Classification Search .................... 385/89
See application file for complete search history.

(56) References Cited

FOREIGN PATENT DOCUMENTS

| | | | |
|---|---|---|---|
| JP | 57 105100 | | 6/1982 |
| JP | 57 121794 | | 7/1982 |
| JP | 57 141524 | | 9/1982 |
| JP | 57141524 | * | 9/1982 |
| JP | 58 154097 | | 9/1983 |
| JP | 58 207199 | | 12/1983 |
| JP | 64 53113 | | 3/1989 |
| JP | 3 61818 | | 3/1991 |
| JP | 5 268191 | | 10/1993 |
| JP | 7 151563 | | 6/1995 |
| JP | 8 307348 | | 11/1996 |
| JP | 8307348 | * | 11/1996 |

* cited by examiner

*Primary Examiner*—Uyen-Chau N Le
*Assistant Examiner*—Hoang Tran
(74) *Attorney, Agent, or Firm*—Oblon, Spivak, McClelland, Maier & Neustadt, L.L.P.

(57) ABSTRACT

An optical power supply type sensing system includes: an optical directivity coupler (6) mounted in a sensor unit (1); a photo-electric converter (4) connected to a first optical fiber (5) among the first to the third optical fiber (5, 7, 8) connected to the optical directivity coupler (6); an optical output device (3) connected to the second optical fiber (7); and a measurement device (10) connected to the third optical fiber (8) drawn out of the sensor unit (1).

8 Claims, 10 Drawing Sheets

OPTICAL POWER SUPPLY TYPE SENSING SYSTEM

TECHNICAL FIELD

This invention relates to an optical power supply type sensing system, in particular, an optical power supply type sensing system used for investigating dissolved oxygen, gas concentration, water quality, pollution, fluid level, amount of water, and so on.

TECHNICAL BACKGROUND

Conventionally, for a water quality contamination monitoring system for measuring dissolved oxygen in water, water pollution, water quality, etc. with a sensor or the like, a detecting place is at a distance from a monitoring station, moreover there is no power supply to supply electric power to the sensor at the detecting place in some cases.

As described above, in the case which there is no power supply at the detecting place, a system for supplying electric power to a sensor by transmitting light from a monitoring station to a detecting place through an optical fiber, and then converting the light to electric power can be employed according to Patent Reference 1.

That system comprises a sensor unit 110 positioned at the detecting place and a measurement device 120 positioned at the monitoring station as illustrated in FIG. 15.

In the sensor unit 110, a supply circuit 112 for supplying electric power to a sensor 111, a light/electric power converter 113 for supplying electric energy to the supply circuit 112, and a LED 114 for receiving output signals from the sensor 111 are provided. The LED 114 and the light/electric power converter 113 are adjacently provided.

An optical fiber 115 is led from the measurement device 120 into the sensor unit 110, and the optical fiber 115 is a single core type and has functions for receiving signal light emitted from the LED 114 as well as irradiating light energy to the light/electric power converter 113.

In the measurement device 120, a light input/output device 121 connected to another end of the optical fiber 115, a micro computer 122 connected to the light input/output device 121, and a battery 123 for supplying electric power to the micro computer 122 are provided. The light input/output device 121 incorporates a light source (not shown) for irradiating light to the light/electric power converter 113 and a light receiving element (not shown) for receiving the optical signal transmitted via an optical fiber 115. The signal electrically converted by the light receiving element is processed by the micro computer 122.

However, in such system, one piece of optical fiber 115 must be arranged in the sensor unit 110 so that the light input/output ranges of the light/electric power converter 113 and the LED 114 are covered. As a result, the distance from an end surface of the optical fiber 115 to the light/electric power converter 113 and the LED 114 becomes longer. In addition, since a part of light irradiated to the light/electric power converter 113 is injected into the LED 114, the electric energy which can be supplied to the sensor 111 becomes smaller.

The less electric power supplied to the sensor 111 is, the weaker optical output signals from the LED 114 is, accordingly not only the optical fiber lead-out distance is limited, but also detection accuracy tends to degrade with taking into account of optical attenuation. Therefore, such systems are used in a car, or the like where a sensor unit and a measurement unit are arranged very close to each other.

Patent Reference 1: Japanese Published Unexamined Patent Application No. H7-151563

DISCLOSURE OF THE INVENTION

Problem to be Solved by the Invention

An object of the present invention is to provide an optical power supply type sensing system capable of detecting physical quantity with accuracy.

Means for Solving the Problem

In a first aspect of the present invention, there is provided an optical power supply type sensing system which comprises: a sensor unit (1) including a light/electric power converter (4) for converting light to electric power, a sensor (2) for measuring physical quantity, and an optical output device (3) for outputting optical signals corresponding to an output of the sensor (2); and a measurement unit (10) including a light source (15) for supplying light energy and a light reception device (14) for receiving the optical signals; and a first optical fiber (5) connected to a light injection area of the light/electric power converter (4) in the sensor unit (1); a second optical fiber (7) connected to a light outputting area of the optical output device (3) device in the sensor unit (1); a first optical directional coupler (6) including a first input/output port (6*a*) connected to the first optical fiber (5) and a second input/output port (6*b*) connected to the second optical fiber (7); and a third optical fiber (8) of which an end is connected to a third input/output port (6*c*) of the first optical directional coupler (6) in the sensor unit (1) and another end is optically coupled to the light reception device (14) and the light source (15) in the measurement unit (10).

In a second aspect of the present invention, there is provided an optical power supply type sensing system which comprises: a sensor unit (1) including a light/electric power converter (4) for converting light to electric power and a sensor (2) for measuring physical quantity; a measurement unit (10) including a light source (25) for supplying light energy and a light reception device (14) for receiving optical data; an optical output device (3) mounted to the measurement unit (10); a first optical fiber (5) which is optically coupled to the optical output device (3) and is arranged in the sensor unit (1); a second optical fiber (7) optically which is optically coupled to the sensor unit (1) and is arranged in the sensor unit (1); a light shielding mechanism (22) which is mounted between one end of the first optical fiber (5) and one end of the second optical fiber (7) in the sensor unit (1), for selecting a shielding or penetrating light of the light transmitted from the first optical fiber (5) to the second optical fiber (7); a determination circuit (21) for controlling the shielding light and penetrating light of the light shielding mechanism (22) based on the output of the sensor (2); and a third optical fiber (23) for connecting the light reception area of the light/electric power converter (4) and the light source (25).

Effect of the Invention

According to the present invention as described above, the light injected into the sensor unit from the light source via an optical fiber by using an optical directional coupler is shifted. This enables the light to be effectively guided only to the light/electric power converter without being guided to the optical output device. Thereby, the electric power output from the light/electric power converter to the sensor increases comparing to conventional cases, which enables the sensor to be driven accurately and stably.

In addition, according to the present invention, since the light shielding mechanism is mounted at a point on the optical fiber provided in the sensor unit and is driven based on the output of the sensor, the optical signal can be transmitted to the measurement unit with accuracy by increasing the intensity of the light transmitted through the optical fiber.

DESCRIPTION OF THE REFERENCE NUMERALS

Figure 1:
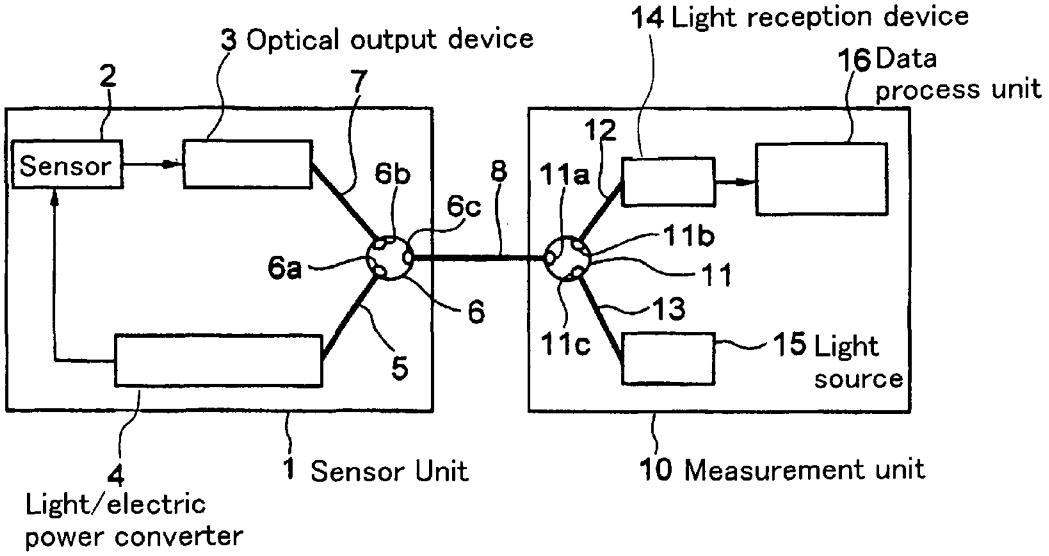
FIG. 1 is a structural view showing an optical power supply type sensing system according to a first embodiment of the present invention.

1, 1$x_1$, . . . , 1$x_n$: sensor unit
2, 2$x_1$, . . . , 2$x_n$: sensor
3, 3$x_1$, . . . , 3$x_n$: optical output device
4, 4$x_1$, . . . , 4$x_n$: light/electric power converter
5, 7, 8, 12, 13: optical fiber
6, 11: optical directional coupler
9*a*: storage device
9*b*: voltage comparator circuit
9*c*: semiconductor switch
9*d*: wiring
10: measurement unit
14, 14$x_1$, . . . , 14$x_n$: light reception devices
15, 25: light source
16: data process unit
17: light control circuit
21: determination circuit
22: light shielding mechanism
23: optical fiber
26: modulator
27: demodulator
28: wavelength converter
29: contact point
30: monitored equipment
31: optical amplifier

THE BEST MODE FOR CARRYING OUT THE CLAIMED INVENTION

Embodiments of the present invention will be described hereinafter in detail with reference to the drawings.

First Embodiment

FIG. 1 is a structural view of an optical power supply type sensing system showing a first embodiment the present invention.

In FIG. 1, a sensor unit 1 is arranged in an object to be measured physical quantity thereof, and a measurement unit 10 is arranged at a distance from the object. The object is, for example water, and the physical quantity is, for example dissolved oxygen.

In the sensor unit 1, a sensor 2 for measuring physical quantity, an optical output device 3 which is connected to the sensor 2 and outputs an optical signal in accordance with an output signal from the sensor 2, and a light/electric power converter 4 for supplying electric energy to a power supply terminal of the sensor 2 are provided. The light/electric power converter 4 comprises elements such as solar battery and photodiode.

An end of a first optical fiber 5 is connected to the light reception area of the light/electric energy converter 4, and the other end of the first optical fiber 5 is connected to a first input/output port 6*a* of a first optical directional coupler 6. Further, an end of a second optical fiber 7 is connected to the optical signal output area of the optical output device 3, and the other end of the second optical fiber 7 is connected to a second input/output port 6*b* of the first optical directional coupler 6. Furthermore, an end of the third optical fiber 8 which is led out to the measurement unit 10 is connected to a third input/output port 6*c* of the first optical directional coupler 6.

On the other hand, in the measurement unit 10, a second optical directional coupler 11 having a first input/output port 11*a* is provided. The measurement unit 10 is connected to another end of the third optical fiber 8. A second input/output port 11*b* of the second optical directional coupler 11 is connected to an end of a fourth optical fiber 12, and a third input/output port 11*c* is connected to an end of a fifth optical fiber 13.

Another end of the fourth optical fiber 12 is connected to a light reception area of a light reception device 14, and another end of the fifth optical fiber 13 is connected to an optical output area of a light source 15. As the light reception device 14, for example an element for converting an optical input signal to an electronic signal, such as photodiode, is used, and an electronic signal end thereof is connected to a data process unit 16.

As the first optical coupler 6 and the second optical coupler 11, for example an optical circulator which is a nonreciprocal optical device with N terminal (N≧3 and integer) that has a function for separating incident light and emitting light is used, respectively.

The first optical coupler 6 is constructed such that the light injected into the third input/output port 6*c* is emitted from the first input/output port 6*a* but not from the second input/output port 6*b*, and the light injected into the second input/output port 6*b* is emitted from the third input/output port 6*c* but not from the first input/output port 6*a*.

Also the second optical coupler 11 is constructed such that the light injected into the first input/output port 11*a* is emitted from the second input/output port 11*b* but not from the third output port 11*c*, and light injected into the third input/output port 11*c* is emitted from the first input/output port 11*a* but not from the second input/output port 11*b*.

In case that an optical connector is used for connecting the sensor unit 1 and the measurement unit 10, the light from a light source is reflected at an optical connector portion, and then is multiplexed with an optical signal from an optical output device. In order to discriminate the reflected light from the optical signal, it is preferred not to apply the matching agent having the same refractive index as the optical fiber to the optical connector portion, perform fusion splicing instead of optical connector connection, or emit the light from the light source when detecting an optical signal.

In such optical power supply type sensing system, continuous optical output from the light source 15 of the measurement unit 10 is injected into the third input/output port 11*c* of the second optical directional coupler 11 via fifth optical fiber 13 and then is output from the first input/output port 11*a* after a light path is shifted in the second optical directional coupler 11, and furthermore is transmitted through the third optical fiber 8 and is injected into the third input/output port 6*c* of the first optical directional coupler 6. Next, the light injected into the third input/output port 6*c* is transmitted from the first input/output port 6*a* though the second optical fiber 5 and is irradiated to a light reception area of the light/electric power converter 4 as light for electric power supply.

The light/electric power converter 4 converts the light energy of incident light into electric energy and supplies the electric power to the sensor 2. Accordingly, in a condition that the light is irradiated via second optical fiber 5, the sensor 2 is supplied electric power from the light/electric power converter 4 and turns to be in a condition capable of measuring physical quantity.

The physical quantity measured by the sensor 2 is converted from an electronic signal to an optical signal by the optical output device 3 and is output to the second optical fiber 7. In this case, the optical output device 3 outputs an optical signal by using a modulation method corresponding to the sensor, such as optical intension modulation, pulse modulation, and frequency modulation.

The optical signal transmitted through the second optical fiber 7 is injected into the second input/output port 6*b* of the first optical directional coupler 6 via second optical fiber 7 and then is output from the third input/output port 6*c* to the third optical fiber 8 after a transmission path is shifted in the first optical directional coupler 6.

The optical signal transmitted thorough the third optical fiber 8 toward the measurement unit 10 is injected into the first input/output port 11*a* of the second optical directional coupler 6, and then is transmitted through the second input/output port 11*b* and the fourth optical fiber 12 to be output to the light reception device 14.

The optical signal injected into the light reception area of the light reception device 14 is converted into an electronic signal, and the electronic signal is output to the data process unit. The data process unit regards the electronic signal as physical quantity measured by the sensor 2 and executes various processes. The data process unit 16 demodulates the electronic signal which has undergone optical intension modulation, pulse modulation, and frequency modulation and then processes the measured data of the sensor 2. Data may be analyzed by displaying an amount of physical quantity (amount of dissolved oxygen in this embodiment) in image, etc. based on data from the sensor 2.

According to the embodiment as described above, the transmission path of the optical signal and the light for electric power supply transmitting through the single core third optical fiber 8 is shifted depending on direction of transmission by use of the optical directional couplers 6, 11.

This makes it possible to separately connect the light/electric power converter 4 and the optical output device 3 to the optical fibers 5 and 7 in the sensor unit 1 and supply light energy output from the light source 15 not to the optical output device 3 but only to the light/electric energy converter 4 effectively even in case of supplying energy and processing signal transmission between the sensor unit 1 and the measurement unit 10 by using the single core optical fiber 8. Moreover, this enables the optical output from the optical output device 3 to be guided not to the light source 15 but only to the light reception device 14 effectively by the second optical directional coupler 11. In addition, the directions of the transmission of the optical signal and the light for electric power supply are different, so that if the optical signal and the light for electric power supply have the same wavelength, transmission path can be shared.

In the embodiment described above, for the first optical fiber and the third optical fiber, a multicore optical fiber can be used instead of single core of optical fiber.

Furthermore, in this embodiment, dissolved oxygen in the water is measured by the sensor 2, but this system can be applied for various physical quantity measurements such as water pollution measurement, measurement of component in the water, and measurement of certain gas concentration in the air at coal mine and metalliforous mine. The same is true on the following embodiments.

Second Embodiment

Figure 2:
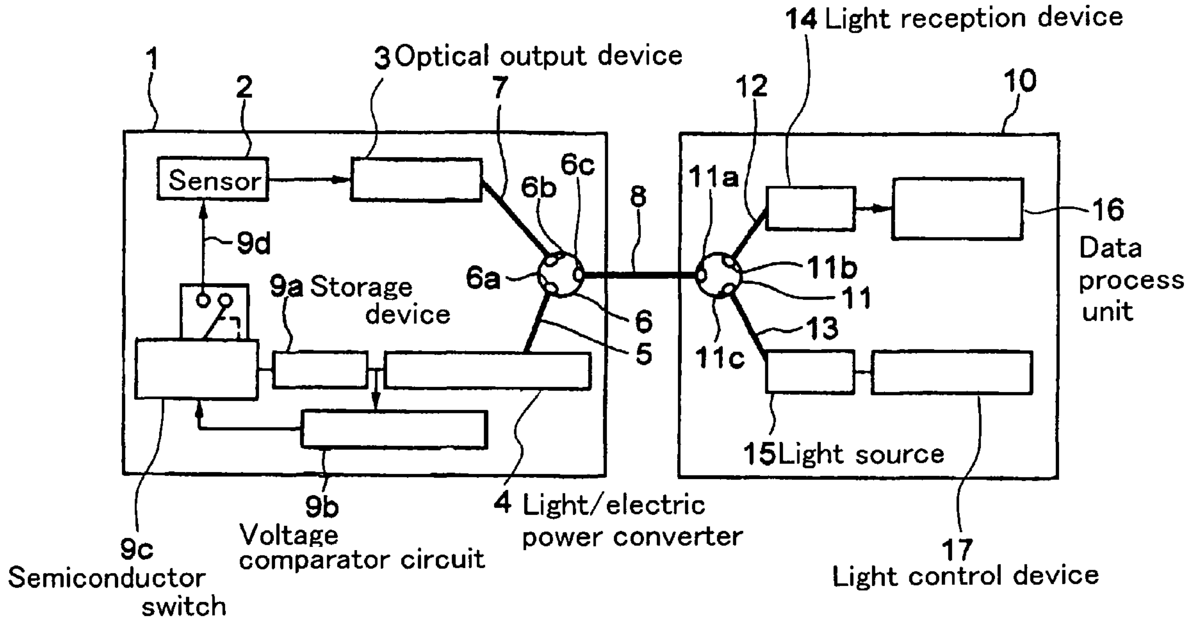
FIG. 2 is a structural view showing an optical power supply type sensing system according to a second embodiment of the present invention.

FIG. 2 is a structural view showing an optical power supply type sensing system of the second embodiment of the present invention. The same parts as those of FIG. 1 are designated by the same numerals.

In FIG. 2, the sensor 2, the optical output device 3, the first optical directional coupler 6 and the first to the third optical fibers 5, 7 and 8 arranged in the sensor unit respectively have the same connection relation as the first embodiment, but the following circuit is connected between the light/electric energy converter 4 and sensor 2.

That is, the sensor unit 1 includes a storage device 9*a* for storing electric power output from the light/electric power converter 4, a voltage comparator circuit 9*b* for comparing a preset reference voltage to an output voltage of the light/electric power converter 4, a semiconductor switch 9*c* which is turned on by an output signal from the voltage comparator circuit 9*b* when the output voltage of the light/electric power converter 4 is lower than the reference voltage, and a wiring

9*d* for supplying electric power in the storage device 9*a* to the sensor 2 in a condition that the semiconductor switch 9*c* is turned ON.

The semiconductor switch 9*c* is configured by, for example a transistor, and is turned on and off by the voltage comparator circuit 9*b*. The voltage comparator circuit 9*b* is a control circuit for electric power supply which is configured to turn off the semiconductor switch 9*c* after a predetermined time passed from outputting a signal to turn on the semiconductor switch 9*c*.

In the measurement unit 10, the third to the fifth optical fibers 8, 12 and 13, the second optical directional coupler 11, the light reception device 14, the light source 15, and the data process unit 16 respectively have the same connection relation as the first embodiment. In addition, a light control circuit 17 for controlling an amount of light from the light source 15 is connected to the light source 15. The light control circuit 17 is configured to decrease the intensity of light energy emission to the light/electric power converter 4 at a timing when an amount of stored electric power of the storage device 9*a* in the sensor unit 1 matches with a predetermined value by decreasing the optical output of the light source 15.

When the stored electric power in the storage device 9*a* matches with the predetermined value and the amount of light emission of the light/electric power converter 4 decreases, the voltage comparator circuit 9*b* turns on the semiconductor switch 9*c*, and the electric power is supplied to the sensor 2 from the storage device 9*a* via wiring 9*d*.

According to the embodiment described above, not only the effect described in the first embodiment is obtained, but also bigger electric power than one supplied from the light/electric power converter 4 per hour can be stored in the storage device 9*a*, hence the electric power can be supplied to the sensor 2, for example which is a type has large electric power consumption. In this case, the sensor 2 measures physical quantity intermittently.

In one example of the sensor unit 1 having the above-mentioned structure, when a 50 mW of light power was output from the light source 15 and was input to the light/electric power converter 4, an electric power of 1.2V, 12 mA, 14.4 mW was generated in the light/electric power converter 4. In other words, even if taking into account of optical coupling loss, etc., around 30% of conversion efficiency could be sufficiently obtained. Moreover, by storing the electric power generated in the light/electric power converter 4 in a storage device 9*a* which was formed by an electric double layer capacitor and pressurizing the electric power by a pressurize circuit not shown in the figure, a load of electric power consumption 20 mA, for example an electric circuit and a LED driven by 5 V could be driven for 30 seconds or more by the stored electric power. Hence, this proves that sufficient electric power to drive the sensor 2 can obtained.

Besides, in an example of the system having the structure above-mentioned, even though the light source output an optical power of 50 mW, and an optical attenuator for 6 dB was inserted between the sensor unit 1 and the measurement unit 10, the output from the sensor 2 could be confirmed. More specifically, the following is expressed:

$$6\text{ dB}=0.7\times L+1$$

wherein a distance between the sensor unit 1 and the measurement unit 10 is L, a transmission loss of the optical fiber is 0.3 dB/km, number of connection point is 4 points/km (0.4 dB/km), optical loss due to connection with a termination box, etc. is 1 dB, so that about 7 km of long distance was proved as L.

In the embodiment descried above, for the first optical fiber and the third optical fiber, a multicore optical fiber can be used instead of the single core optical fiber.

Third Embodiment

In this embodiment, a system having a structure capable of decreasing the intensity of optical signals transmitted from the sensor unit 1 to the optical fiber 8 will be explained.

Figure 3:
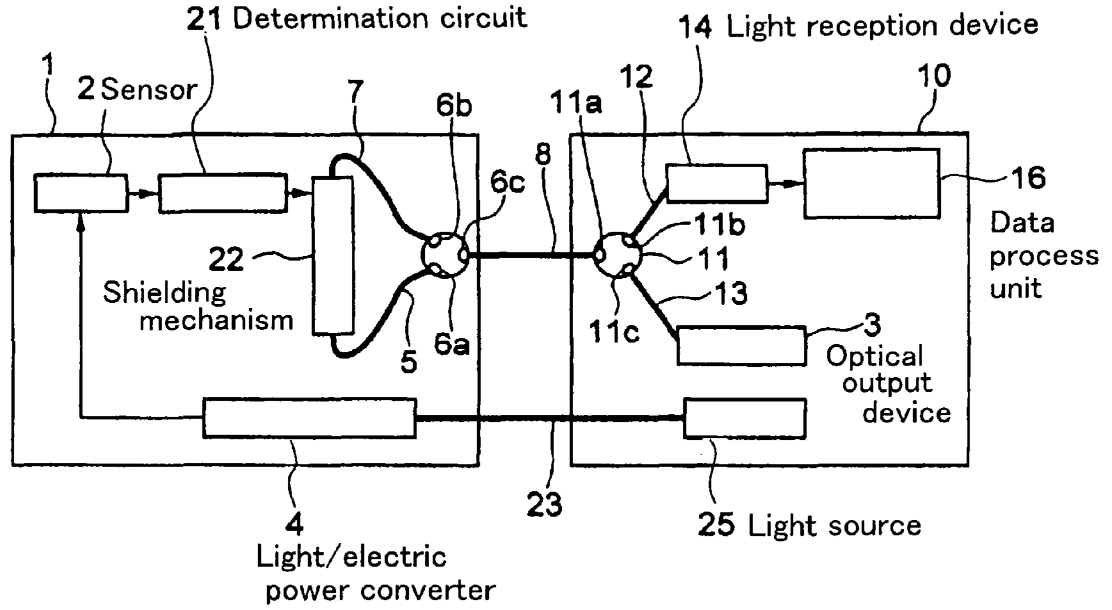
FIG. 3 is a structural view showing an optical power supply type sensing system according to a third embodiment of the present invention.

FIG. 3 is a structural view showing an optical power supply type sensing system of the third embodiment of the present invention and the same parts as those of FIG. 1 are designated by the same numerals.

In the sensor unit 1, a determination circuit 21 for determining "0" or "1" based on the output signal from the sensor 2 to measure physical quantity, a light shielding mechanism 22 arranged between an end of the first optical fiber 5 and an end of the second optical fiber 7, and the light/electric power converter 4 for supplying electric power to the sensor 2 are provided. The light shielding mechanism 22 is switched to be either condition of shielding or penetrating light by the output signal from the determination circuit 21. For example, when the determination circuit 21 determines "0" (or "1"), the condition is switched to penetrating, and when the determination circuit 21 determines "1" (or "0"), the condition is switched to light shielding.

The light shielding mechanism 22 may include, for example, mechanical shatter, optical valve, optical shatter using Kerr effect, optical shatter using liquid crystal, optical semiconductor device.

Another ends of the first and second optical fibers 5 and 7 are connected to the first input/output port 6*a* and the second input/output port 6*b* of the first optical directivity coupler 6, respectively, as in the first embodiment. An end of the sixth optical fiber 23 is connected to the light reception area of the light/electric power converter 4. In addition, the output end of the light/electric energy converter 4 is connected to supply electric power to the sensor 2.

In the other hand, in the measurement unit 10, a light source 25 to be connected to another end of the sixth optical fiber 23 is arranged, and a light reception device 14 to be connected to the second input/output port 11*b* of the second optical directional coupler 11 via fourth optical fiber 12 is also arranged. Furthermore, an optical output device 3 is connected to the third input/output port 11*c* of the second optical directional coupler 11 via fifth optical fiber 13.

In such optical power supply type sensing system, the optical output from the optical output device 3 is input to the third input/output port 11*c* of the second optical directional coupler 11 and is transmitted from the first input/output port 11*a* through the third optical fiber 8 and is input to the third input/output port 6*c* of the first optical directional coupler 6, and then is transmitted from the first input/output port 6*a* through the first optical fiber 5.

When the light shielding mechanism 22 is in penetrating condition, the light transmitted in the first optical fiber 5 is injected into the second optical fiber 7 via light shielding mechanism 22, and is further injected to the first input/output port 11*a* of the second optical directional coupler 11 after transmitting in the second input/output port 6*b* of the first optical directional coupler 6, the third input/output port 6*c*, and the third optical fiber 8, and then is injected from the second input/output port 11*b* to the light reception device 14. In addition, the data process unit 16 determines that the signal at the time when the light is injected into the light reception device 14 is "0" (or "1").

Meanwhile, when the light shielding mechanism 22 is in the light shielding condition, the light transmitted into the first optical fiber 5 is not irradiated into the second optical fiber 7, so that the light reception device 14 will be in the condition that the light is not to be transmitted. In this case, the data process unit 16 determines that the signal at the time when the light is not input into the light reception device 14 is "1" (or "0").

As a result, the physical quantity measured by the sensor 2 is pulse modulated by the determination circuit 21 and the light shielding mechanism 22 so as to be output to the measurement unit 10. In addition, since the optical output device 3 is provided in the measurement unit 10, high intensity light can be input to the sensor unit 1 by supplying high electric power. This enables the intensity of the optical signal which is transmitted into the measurement unit 10 to increase.

Moreover, the sixth optical fiber 23 different line from the optical signal is connected to the light/electric power converter 4 connected to the sensor 2, and the high intensity light irradiated from light source 25 in the measurement unit 10 is irradiated after transmitting through the sixth optical fiber 23. This enables the light/electric power converter 4 to generate higher electric power, and supply the electric power to the sensor 2 with a rating such as voltage of 5 V, current of 10 mA.

Therefore, in this embodiment, it is advantageous not only for making output the optical signal based on the physical quantity measured by the sensor 2 as explained in the first and the second embodiment, but also for increasing the intensity of the optical signal.

In the embodiment descried above, for the first optical fiber and the third optical fiber, a multicore optical fiber may be used instead of the single core optical fiber.

Fourth Embodiment

In this embodiment, a structure capable of correcting data measured by the sensor 2 by remote control from the measurement unit 10 will be described below by use of a system of the third embodiment.

Figure 4:
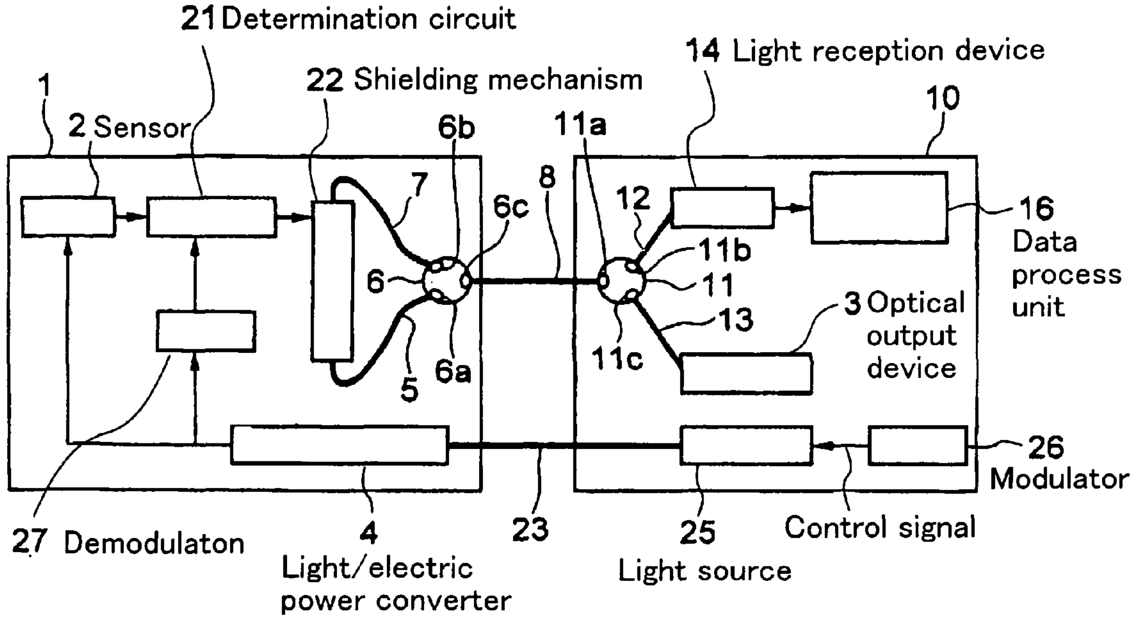
FIG. 4 is a structural view showing an optical power supply type sensing system according to a fourth embodiment of the present invention.

FIG. 4 is a structural view showing an optical power supply type sensing system of the fifth embodiment of the present invention. In FIG. 4, the same parts as those of FIG. 3 are designated by the same numerals.

In FIG. 4, a modulator 26 for modulating light input/output from the light source 25 is provided in the measurement unit 10. A demodulator 27 for demodulating electric control signal output from the light/electric power converter 4 and for sending the demodulated signal to determination circuit 21 is provided in the sensor unit 1. Thus, the system is structured to control a threshold for determining "0" or "1" to the output value of the sensor 1 in the determination circuit 21.

In this system, when the threshold of the determination circuit 21 is changed, a threshold change signal is modulated by the modulator 26 and then the modulated signal is sent to the light source 25 as a control signal, the light source 25 converts the control signal to an optical signal and sends the optical signal to the sensor unit 1 via the sixth optical fiber 23. In the sensor unit 1, the light/electric power converter 4 converts the optical signal sent from the sixth optical fiber 23 to an electronic signal and sends the electronic signal to the demodulator 27.

Moreover, the demodulator 27 demodulates the control signal output from the light/electric power converter 4 and sends the threshold change signal to the determination circuit 21. And then, in the determination circuit 21, the threshold to the output signal of the sensor 2 for selecting the shielding or penetrating light of the light shielding mechanism 21 is changed based on the threshold change signal and the output signal of the sensor 2. This changes the output of the sensor 2 and makes the sensibility thereof to be equal to a corrected value. In this case, the light reception device 14 receives the optical signal pulse modulated by the light shielding mechanism 22, and the data process unit 16 check whether the change of the threshold is proper or not.

Furthermore, when autognosis is conducted to see whether the system operates normally, a control signal is sent from the modulator 26 in the measurement unit 10 so that the threshold is higher or lower than the threshold of the determination circuit 21 which is set within the normal measurement range of the sensor 2.

In this case, when the threshold is set higher, even if a pulse height value of the signal output from the sensor 2 increases within the measurement range, the light shielding mechanism 22 turns to be in the light shielding condition, consequently, the light is input to the light reception device 14 of the measurement unit 10. When the threshold is set lower, a pulse height value of the signal from the sensor 2 decreases within the measurement range, and the light shielding mechanism 22 turns to be in the penetrating condition. More specifically, an ON condition is reversed to an OFF condition by setting the threshold to higher than normal range, and, the OFF condition is reversed to the ON condition by setting the threshold to lower than normal range. This makes it possible to checking whether the system operation is normally or not.

Thereby, although the output of the sensor 2 varies due to aging or environment, etc., the data of the physical quantity measured by the sensor 2 can be transmitted to the measurement unit 10 with accuracy, or the output of the sensor 2 by the user in accordance with the condition can be controlled.

In the embodiment descried above, for the first optical fiber and the third optical fiber, a multicore optical fiber can be used instead of the single core optical fiber.

Fifth Embodiment

In this embodiment, a system applicable to the case where there is room for laying a number of optical fibers between the measurement unit 10 and the sensor unit 1 will be described.

Figure 5:
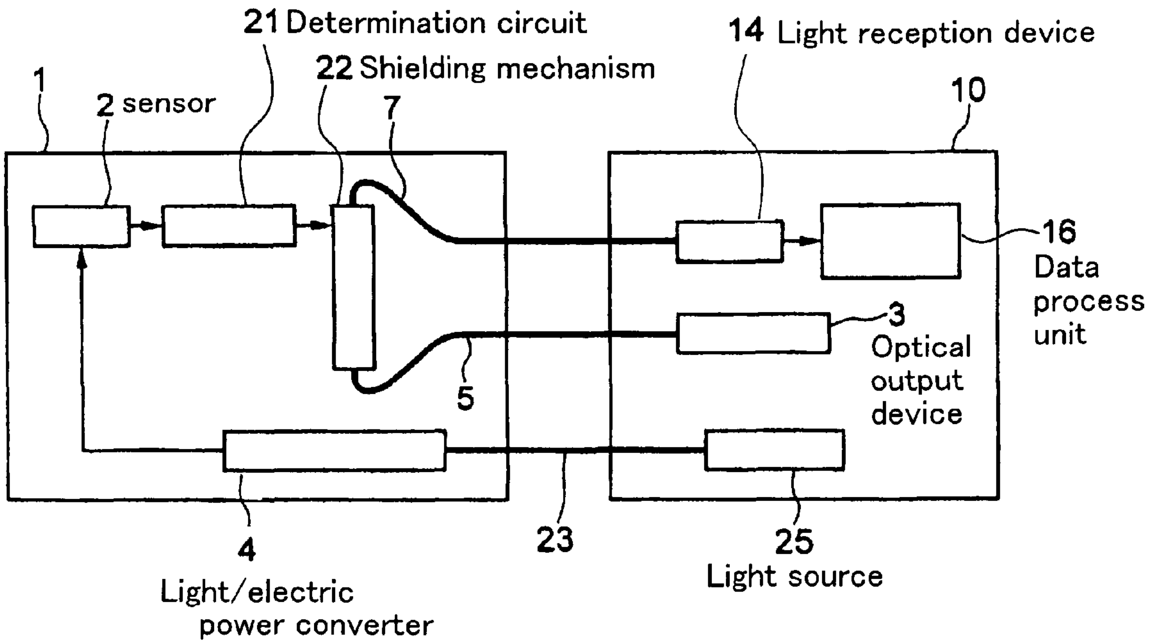
FIG. 5 is a structural view showing an optical power supply type sensing system according to a fifth embodiment of the present invention.

FIG. 5 is a structural view showing an optical power supply type sensing system of the fifth embodiment of the present invention. The same parts as those of FIG. 3 are designated by the same numerals.

In FIG. 5, each of the sensor 2, the light/electric power converter 4, the determination circuit 21, and the light shielding mechanism 22 in the sensor unit 1 has the same connection relation as the third embodiment. In addition, the light/electric power converter 4 is connected to the light source 25 via third optical fiber 23 similarly to the third embodiment.

The first optical fiber 5 connected to the light shielding mechanism 22 in the sensor unit 1 is led out from the sensor unit 1 and is connected to the optical output device 3 in the measurement unit 10. The second optical fiber 7 connected to the light shielding mechanism 22 is led out from the sensor unit 1 and is connected to the light reception device 14 in the measurement unit 10.

As described above, in this embodiment, the first optical fiber 5 is led out from the sensor unit 1 to the measurement unit 10 so as to connect the light shielding mechanism 22 to the optical output device 3, moreover, the second optical fiber 7 is led out from the sensor unit 1 to the measurement unit 10 so as to connect the light shielding mechanism 22 to the light reception device 14 without using the optical directional couplers 6 and 11 shown in the third embodiment.

Therefore, the optical output from the optical output device 3 is transmitted to the light shielding mechanism 22 via first optical fiber 5. The determination circuit 21 controls the light shielding mechanism 22 based on the measured value of the sensor 2, so that the light shielding mechanism 22 forms an optical signal from the optical output from the first optical fiber 5. The optical signal is transmitted to the second optical fiber 7, and then is injected into the light reception device 14 without converting by controlling the light shielding mechanism 22 based on the measured value of the sensor 2.

As a result, the optical directional coupler is omitted, and this makes it possible to simplify the structure in the sensor unit 1 and save the cost.

In this embodiment, the system may further includes the storage device connected to the electric power output end of the light/electric power converter 4, the switching device connected between the output end of the storage device and the sensor 2, and the electric power supply control circuit for outputting stored electric power in the storage device to the sensor 2 as described in FIG. 2.

In the embodiment descried above, for the first optical fiber, a multicore optical fiber may be used instead of single core of optical fiber.

Sixth Embodiment

In this embodiment, an optical power supply type sensing system which is configured to process the physical quantity measured by a plurality of sensor units at a measurement unit will be described.

Figure 6:
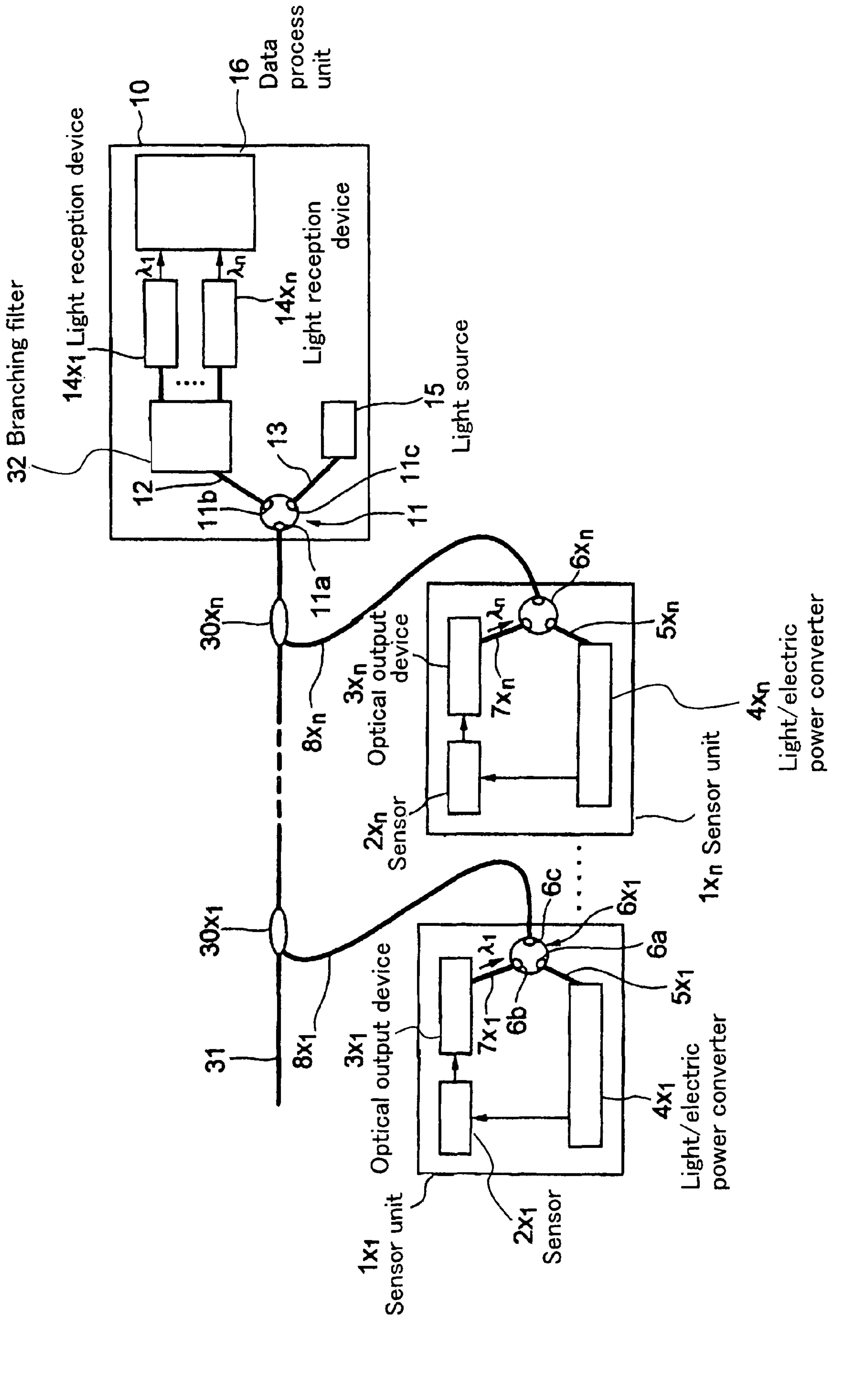
FIG. 6 is a structural view showing an optical power supply type sensing system according to a sixth embodiment of the present invention.

FIG. 6 is a structural view showing an optical power supply type sensing system of the sixth embodiment of the present invention. In FIG. 6, the same parts as those of FIG. 1 are designated by the same numerals.

In FIG. 6, a plurality of sensor units 1$x_1$, . . . , 1$x_n$ are respectively provided with sensors 2$x_1$, . . . , 2$x_n$ for measuring physical quantity, optical output devices 3$x_1$, . . . , 3$x_n$ for outputting an optical signal which is corresponding to the output signal from the sensors 2$x_1$, . . . , 2$x_n$, and light/electric power converters 4$x_1$, . . . , 4$x_n$ for supplying electric energy to a power supply terminal of the sensors 2$x_1$, 2$x_n$ similarly to the first embodiment. Each optical output device 3$x_1$, . . . , 3$x_n$ is configured to output an optical signal with different wavelength $\lambda_1$, . . . , $\lambda_n$.

The light reception surfaces of the light/electric power converters 4$x_1$, . . . , 4$x_n$ are connected to one ends of first optical fibers 5$x_1$, . . . , 5$x_n$, and another ends of the first optical fibers 5$x_1$, . . . , 5$x_n$ are connected to the respective first input/output ports 6$a$ of first optical directional couplers 6$x_1$, . . . , 6$x_n$, respectively. Moreover, the optical signal output surfaces of the optical output devices 3$x_1$, . . . , 3$x_n$ are connected to one ends of the second optical fibers 7$x_1$, . . . , 7$x_n$, and another ends of the second optical fibers 7$x_1$, . . . , 7$x_n$ are connected to the respective second input/output ports 6$b$ of the first optical directional couplers 6$x_1$, . . . , 6$x_n$, respectively. Furthermore, the respective third input/output ports 6$c$ of the first optical directional couplers 6$x_1$, . . . , 6$x_n$ are connected to one ends of the third optical fibers 8$x_1$, . . . , 8$x_n$ which are led out to the measurement unit 10.

The optical output devices 3$x_1$, . . . , 3$x_n$ respectively attached to the plurality of sensors 2$x_1$, . . . , 2$x_n$ are configured to output optical signals with different wavelength. In addition, the other ends of the third optical fibers 8$x_1$, . . . , 8$x_n$ respectively connected to the sensor units 2$x_1$, . . . , 2$x_n$ are connected to an optical fiber 31 for bus line via optical couplers 30$x_1$, . . . , 30$x_n$.

On the other hand, in the measurement unit 10, the second optical directional coupler 11 including the first input/output port 11$a$ to be connected to another end of the optical fiber 31 for bus line is attached, and the second input/output port 11$b$ of the second optical directional coupler 11 is connected to one end of the fourth optical fiber 12, furthermore the third input/output port 11$c$ is connected to one end of the fifth optical fiber 13. In addition, another end of the fourth optical fiber 12 is connected to a branching filter 32, and the branching filter 32 is configured to separate optical signals with different wavelengths $\lambda_1$, . . . , λn and output the separated signals to respective light reception devices 14$x_1$, . . . , 14$x_n$.

The plurality of light receiving elements 14$x_1$, . . . , 14$x_n$ are connected to the data process unit 16, and the data process unit 16 checks locations of sensor units 1$x_1$, . . . , 1$x_n$ in accordance with the difference of wavelength input from the light receiving elements 14$x_1$, . . . , 14$x_n$ while processing the measured data of the sensors 2$x_1$, . . . , 2$x_n$ therein.

In this optical power supply type sensing system, the light emitted from the light source 15 in the measurement unit 10 is transmitted through the fifth optical fibers 13$x_1$, . . . , 13$x_n$, is shifted to be output from the first input/output port 11$a$ after being injected into the third input/output port 11$c$ of the second optical directional coupler 11, and then is output to the optical fiber 31 for bus line.

The light from the light source 15 injected into the optical fiber 31 for bus line is branched by the plurality of optical couplers 30$x_1$, . . . , 30$x_n$ into the plurality of third optical fibers 8$x_1$, . . . , 8$x_n$ and is input to the respective third input/output ports 6$c$ of the first optical directional couplers 6$x_1$, 6$x_n$ in the sensor units 1$x_1$, . . . , 1$x_n$.

Then, the light injected into the respective third input/output ports 6$c$ are transmitted through the second optical fibers 5$x_1$, . . . , 5$x_n$ and are irradiated to the light reception surfaces of the light/electric energy converters 4$x_1$, . . . , 4$x_n$, respectively.

The light/electric power converters 4$x_1$, . . . , 4$x_n$ convert the irradiated optical energy to electric energy and supply the electric power to the sensors 2$x_1$, . . . , 2$x_n$. This makes it possible that the sensors 2$x_1$, . . . , 2$x_n$ are in condition capable of measuring physical quantity.

The physical quantity measured by the sensors 2$x_1$, . . . , 2$x_n$, are output from the optical output devices 3$x_1$, . . . , 3$x_n$ as optical signals. Then, the optical signals are input to the respective first input/output ports 6$a$ of the first optical directional couplers 6$x_1$, . . . , 6$x_n$ via first optical fibers 7$x_1$, . . . , 7$x_n$, are furthermore output from the respective third input/output ports 6$c$ to the third optical fibers 8$x_1$, . . . , 8$x_n$, are additionally input to the optical fiber 31 for bus line via optical couplers 30$x_1$, . . . , 30$x_n$, are then input to the first input/output port 11$a$ of the second optical directional coupler 11, and are transmitted from the second input/output port 11$b$ through the fourth optical fiber 12 and are finally output to the branching filter 32.

The branching filter 32 separates the optical signals into respective light reception devices 14$x_1$, . . . , 14$x_n$ by wavelengths $\lambda x_1$, . . . , $\lambda x_n$. The optical signals input into the respective light reception devices 14$x_1$, . . . , 14$x_n$ are converted to electronic signals and input to the data process device 16. And then, the data process unit 16 processes the physical quantity measured by the plurality of sensors 2$x_1$, . . . , 2$x_n$ based on the signals output from the respective light reception devices 14$x_1$, . . . , 14$x_n$.

As described above, the physical quantity measured by the sensor units 1$x_1$, . . . , 1$x_n$ are converted to the optical signals, and the optical signals are transmitted through the optical fiber for bus line via the optical couplers 30$x_1$, . . . , 30$x_n$, and the measured physical quantity measured by the plurality of sensors $2x_1, \ldots, 2x_n$ are processed in the single measurement unit 10 in this embodiment. This makes it easier to control the measured data of the sensors $2x_1, \ldots, 2x_n$.

A structure in which the output signals from the optical output devices $3x_1, \ldots, 3x_n$ in the plurality of sensor units $1x_1, \ldots, 1x_n$ are applied a different modulation may be employed. In this case, a demodulator is used instead of the branching filter 32 in the measurement unit. In such structure, the wavelengths $\lambda_1, \ldots, \lambda_n$ of the optical output devices $3x_1, \ldots, 3x_n$ in the sensor units $1x_1, \ldots, 1x_n$ may be set to be equal.

Furthermore, FIG. 6 shows the example in case of using a plurality of the sensor units used in the first embodiment, but a plurality of the sensor units used in any of the second to fifth embodiments may also be used. In this case, in order to connect the plurality of sensor units 1 to the single measurement unit 10, number of optical fibers for bus line and optical couplers corresponding to the number of optical fibers led out from the sensor unit 1 are needed.

Seventh Embodiment

In this embodiment, a contamination control structure of the sensor unit employed in the above-mentioned embodiments will be described.

Figure 7:
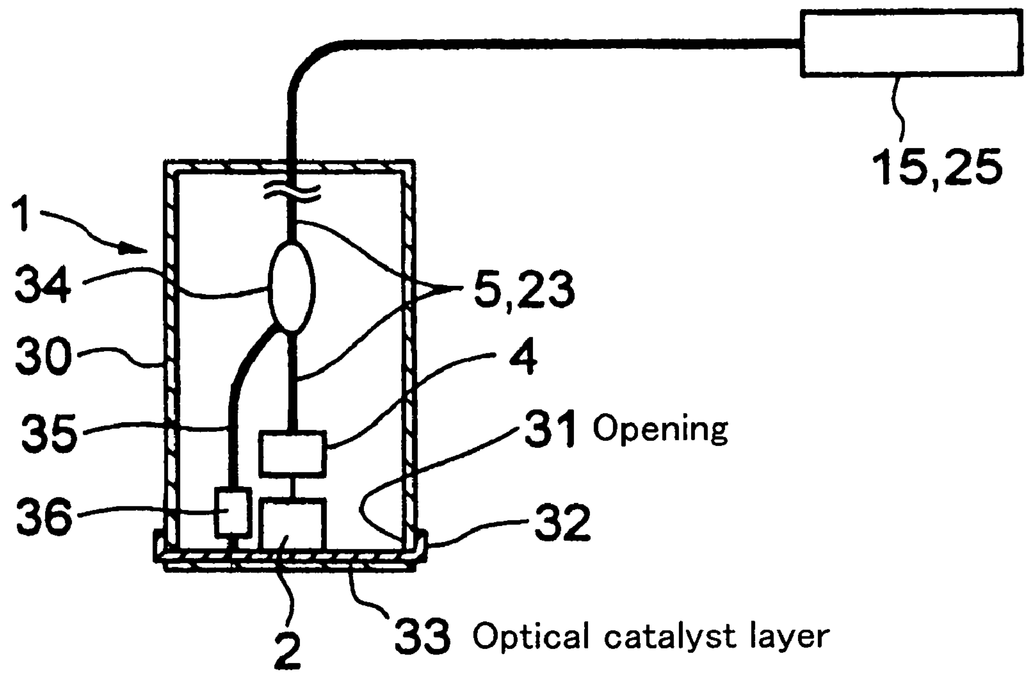
FIG. 7 is a cross-sectional view showing a first example of a contamination control mechanism provided in an optical power supply type sensing system according to a seventh embodiment of the present invention.

FIG. 7 is a cross-sectional view of a part of a housing of the sensor unit and the sensor of the optical power supply type sensing system according to the seventh embodiment of the present invention. The same parts as those of FIG. 1 to FIG. 6 are designated by the same numerals.

In FIG. 7, an opening 31*a* is formed at the bottom of a housing 30 of the sensor unit 1. The opening 31 is blocked by a transparent film 32. An optical catalyst layer 33, for example a titanium oxide layer, is formed at the lower surface of the transparent film 32. The titanium oxide layer retains optical transparency by controlling the manufacturing method, film thickness, and so on, and is formed by for example mixing powder of titanium oxide with light permeable binder or baking titanium peroxide solution.

Moreover, an optical fiber 35 for supplying light branched via an optical coupler 34 from the optical fibers 5 and 23 for supplying electric power to be connected to the light/electric power converter 4 of each embodiment descried above is arranged in the housing 30. The optical fiber 35 for supplying light is pulled out to the transparent film 32 via a wavelength conversion element 36, and an edge thereof is contactly connected to the transparent film 32. The wavelength conversion element 36 is formed by such as nonlinear optical material which converts infrared light to ultraviolet radiation, or semiconductor laser.

In case of using such sensor unit 1, when electric power is supplied to the sensor 2 by inputting light to the light/electric power converter 4 via the optical fibers 5 and 23 for supplying electric power from the light sources 15 and 25, the light transmitting the optical fibers 5 and 23 is branched to the optical fiber 35 for supplying light by the optical coupler 34.

The light transmitted through the optical fiber 35 for supplying light is irradiated to the transparent film 32 after the wavelength is converted by the wavelength conversion element 36. The light penetrated into the transparent film 32 is irradiated to an optical catalyst layer 33 to cause catalyzed reaction and degrade contamination on the surface of the optical catalyst layer 33. Besides, the edge of the optical fiber 35 for supplying light comes in contact with the transparent film 32 and is fixed, therefore, it is designed not to be contaminated. In addition, if the transparent film 32 is formed by a predetermined material having a high refractive index, the light irradiated to the transparent film 32 is irregularly reflected to emit wider area of the optical catalyst layer 33.

The above-mentioned optical catalyst layer 33 may not be formed at the lower surface of the sensor unit 1 but may be formed only at the sensor 2. For example, when the sensor 2 is an oxygen concentration detection element for detecting an amount of oxygen in a certain atmosphere, a detection surface of the sensor 2 is covered by the optical catalyst layer 33 as shown in FIG. 8.

Figure 8:
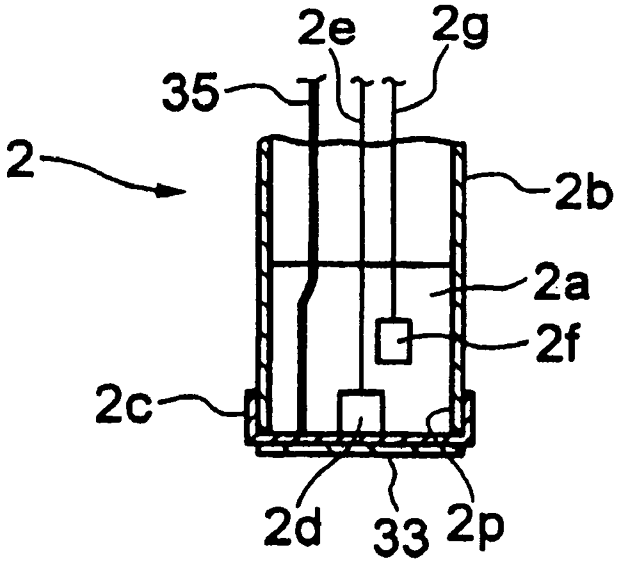
FIG. 8 is a cross-sectional view showing a second example of the contamination control mechanism provided in the optical power supply type sensing system according to a seventh embodiment of the present invention.

In FIG. 8, the sensor 2 has a casing 2*b* capable of storing electrolysis solution 2*a* such as potassium hydroxide (KOH), and the opening 2*p* at the bottom of the casing 2*b* is covered by an oxygen permeable light transmissive film 2*c* such as polyterafluoro-ethyrene film. Furthermore, an optical catalyst layer 33 is formed at the lower surface of the oxygen permeable light transmissive film 2*c*.

In the electrolysis solution 2*a* in the casing 2*b*, a negative electrode 2*d* is connected to a first signal line 2*e* and is arranged adjacent to the oxygen permeable light transmissive film 2*c*. In addition, a positive electrode 2*f* is connected to a second signal line 2*g* and is arranged at the upper side of the negative electrode 2*d* in the electrolysis solution 2*a*. The negative electrode 2*d* is comprised of such as silver (Ag), gold (Au), or copper (Cu), and the positive electrode 2*f* is comprised of such as lead (Pb), and stannum (Sn).

Moreover, the optical fiber 35 for supplying light is inserted in the electrolysis solution 2*a* and is connected to the oxygen permeable light transmissive film 2*c* in the casing 2*b*.

In case of using such sensor 2, since the ultraviolet radiation transmitted through the optical fiber 35 for supplying light is penetrated into the oxygen permeable light transmissive film 2*c* and is irradiated to the optical catalyst layer 33 to degrade contaminant on the surface of the optical catalyst layer 33, contamination on the measurement surface of the sensor 2 is prevented and the deterioration of measurement accuracy is controlled.

Figure 9:
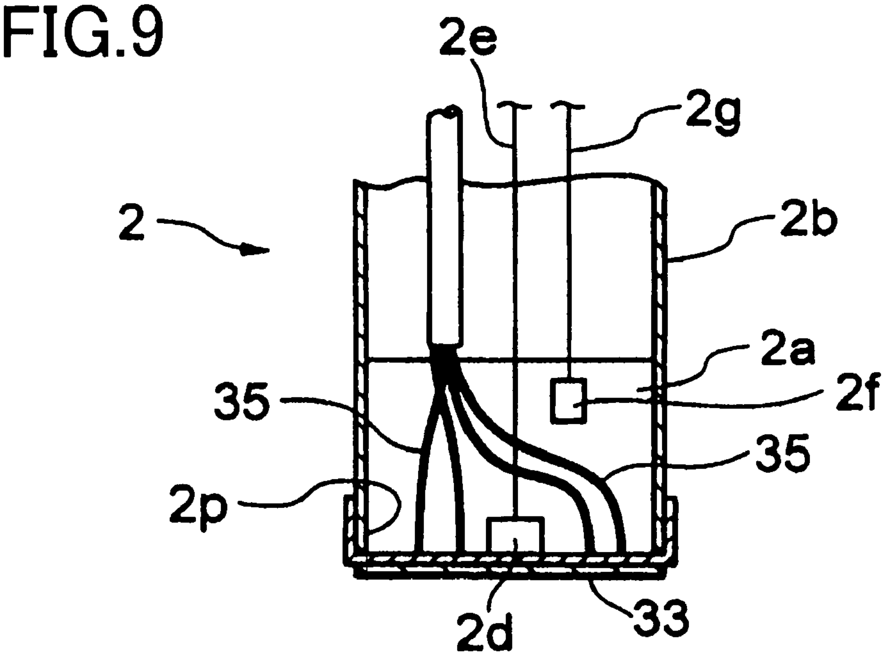
FIG. 9 is a cross-sectional view showing a third example of the contamination control mechanism provided in the optical power supply type sensing system according to a seventh embodiment of the present invention.

When the range of the light irradiated by the optical fiber 35 for supplying light is not sufficient, by connecting a plurality of bundled optical fibers 35 for supplying light to the oxygen permeable light transmissive film 2*c* in separating dispersion condition as shown in FIG. 9, the light emission range of the optical catalyst layer 33 can be widened and the contaminant degrading efficiency can be elevated.

Eighth Embodiment

Figure 10:
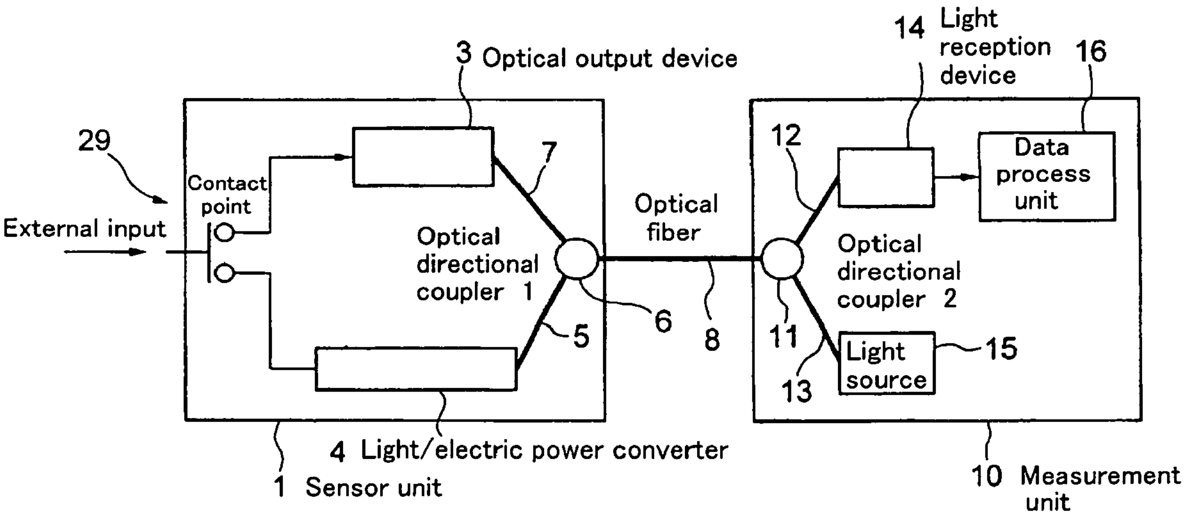
FIG. 10 is a structural view showing an optical power supply type sensing system according to an eighth embodiment of the present invention.

FIG. 10 is a structural view of an optical power supply type sensing system showing an eighth embodiment of the present invention. Detection is performed by inputting contact point signals in this embodiment.

In the embodiment shown in FIG. 10, a contact point 29 of which ON/OFF condition is switched by an external input is provided instead of the sensor 2 for measuring physical quantity of the first embodiment according to the present invention shown in FIG. 1. The contact point 29 is in an OFF condition when there is no external input, that is, in normal condition, and turns to be in an ON condition when there is external input, that is in abnormal condition. When contact point 29 is in the OFF condition, the voltage from the light/electric power converter 4 is not input to the optical output device 3, and when the contact point 29 is in the ON condition, the electric power is input to the optical output device 3 from the light/electric power converter 4. In other words, a circuit for controlling ON/OFF of the output voltage of the light/electric power converter 4 depending on the condition of an object to be measured.

For example, similarly to the first embodiment, if the object to be measured is water when dissolved oxygen exceeds a predetermined value, it is preferable that a signal is input to the contact point 29 as an external input.

When the contact point 29 is in the ON condition, the voltage input from the light/electric power converter 4 is converted from an electronic signal to an optical signal by the optical output device 3 similarly to the first embodiment and is output to the second optical fiber 7. Other conditions are the same as the first embodiment.

Ninth Embodiment

Figure 11:
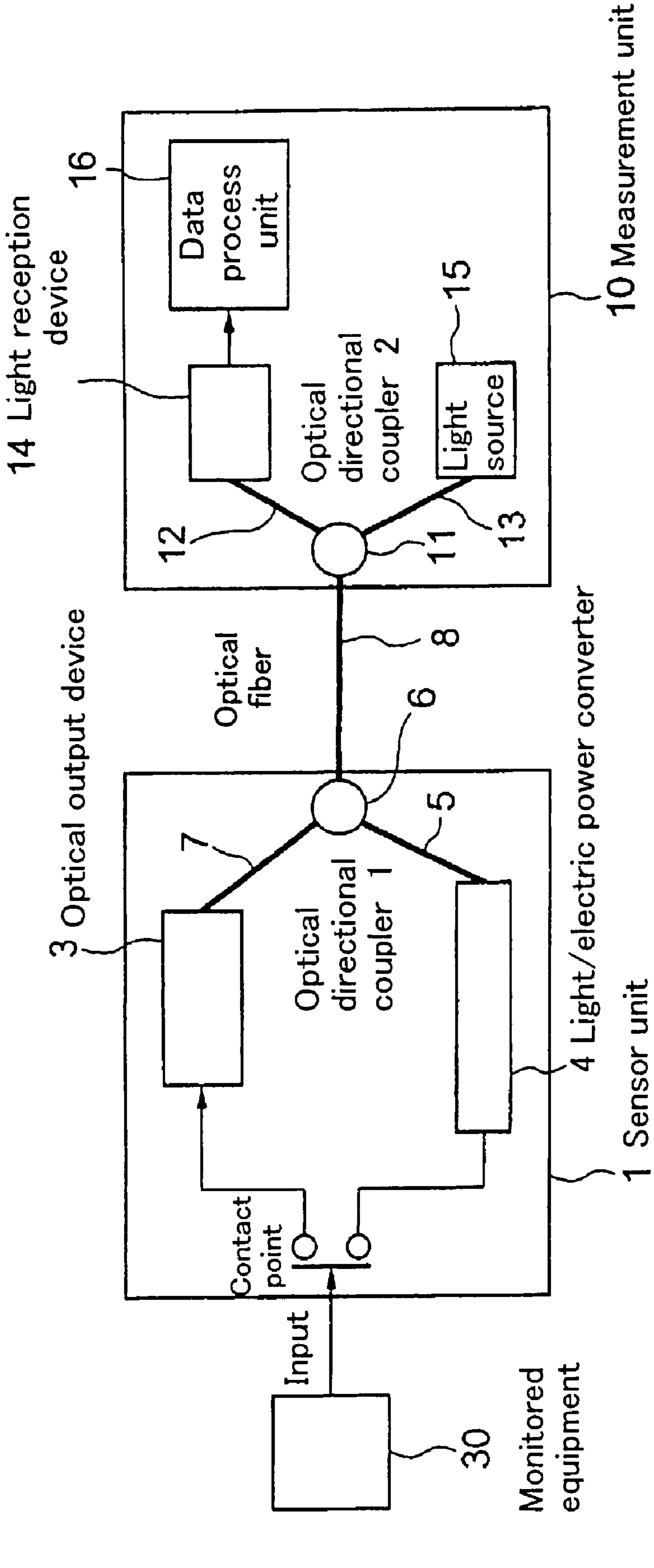
FIG. 11 is a structural view showing an optical power supply type sensing system according to a ninth embodiment of the present invention.

FIG. 11 is a structural view of an optical power supply type sensing system showing a ninth embodiment of the present invention.

In the embodiment shown in FIG. 11, a contact point of which ON/OFF condition is switched by an input in accordance with conditional variation of monitored equipment is provided instead of the sensor 2 for measuring physical quantity of the first embodiment according to the present invention shown in FIG. 1. For example, the contact point is provided in the tank, and when a water level in the tank is higher than a certain height, the contact point is in normal condition and in an OFF condition, when the water level is lower than a certain height, the contact point is in abnormal condition and in an ON condition. When the contact point is in the OFF condition, the voltage from the light/electric power converter 4 is not input to the optical output device 3, and the contact point is in the ON condition, the electric power from the light/electric power converter 4 is input to the optical output device 3. In other words, the circuit for controlling ON/OFF condition of the output voltage from the light/electric power converter 4 in accordance with the condition of an object to be measured is provided in this embodiment, too.

When the contact point is in ON condition, the voltage input by the light/electric power converter 4 is converted from the electronic into the optical signal by the optical output device 3 and is output to the second optical fiber 7. Other conditions are the same as the first embodiment.

In FIG. 10 to FIG. 11, structures in which the detection is carried out by inputting contact point signals are shown, but a structure for inputting analog signals is also preferable.

Tenth Embodiment

Figure 12:
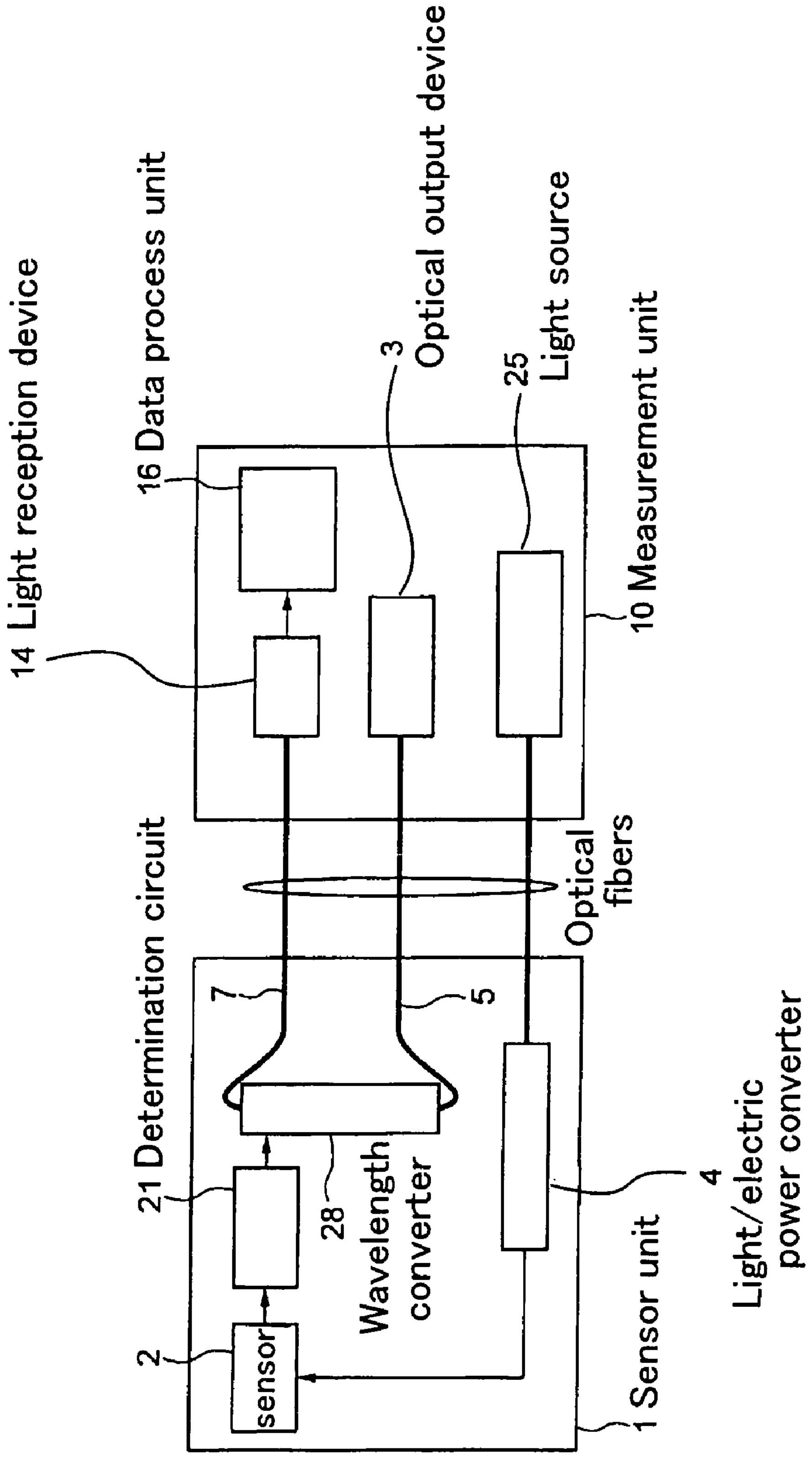
FIG. 12 is a structural view showing an optical power supply type sensing system according to a tenth embodiment of the present invention.

FIG. 12 is a structural view of an optical power supply type sensing system showing a tenth embodiment of the present invention.

In the embodiment shown in FIG. 12, a wavelength converter 28 is used instead of the light shielding mechanism of the fifth embodiment according to the present invention shown in FIG. 5. For the wavelength converter 28, for example FBG and piezo element can be used. More specifically, a mechanism comprising FBG and piezo element, which transmits distortion generated at the piezo element to FBG, can be used.

In this embodiment, instead of using the optical directional couplers 6 and 11 shown in the third embodiment, the first optical fiber 5 is pulled out from the sensor unit 1 to the measurement unit 10 to connect the wavelength converter 28 to the optical output device 3, and in addition the second optical fiber 7 is pulled out from the sensor unit 1 to the measurement unit 10 to connect the wavelength converter 28 to the light reception device 14.

Therefore, the optical output from the optical output device 3 is transmitted to the wavelength converter 28 via first optical fiber 5. In addition, the determination circuit 21 controls the wavelength converter 28 based on the measured value of the sensor 2. For example, when it is in normal condition, the optical output from the first optical fiber 5 is transmitted to the second optical fiber 7 without the wavelength converted by the wavelength converter 28, and the optical signal is input to the light reception device 14 as it is. When it is in abnormal condition, the light controlled by the determination circuit 21 and output from the first optical fiber 5 is wavelength converted by the wavelength converter 28, and the wavelength converted optical signal is transmitted through the second optical fiber 7 and then is input to the light reception device 14. Other conditions are the same as the fifth embodiment of the present invention.

In addition, the structure utilizing the contact point input employed in FIG. 10 to 11 is also preferable. In this case, it is also possible to generate effective electric power more efficiently when the wavelengths of incident light and emitting light are different.

Eleventh Embodiment

Figure 13:
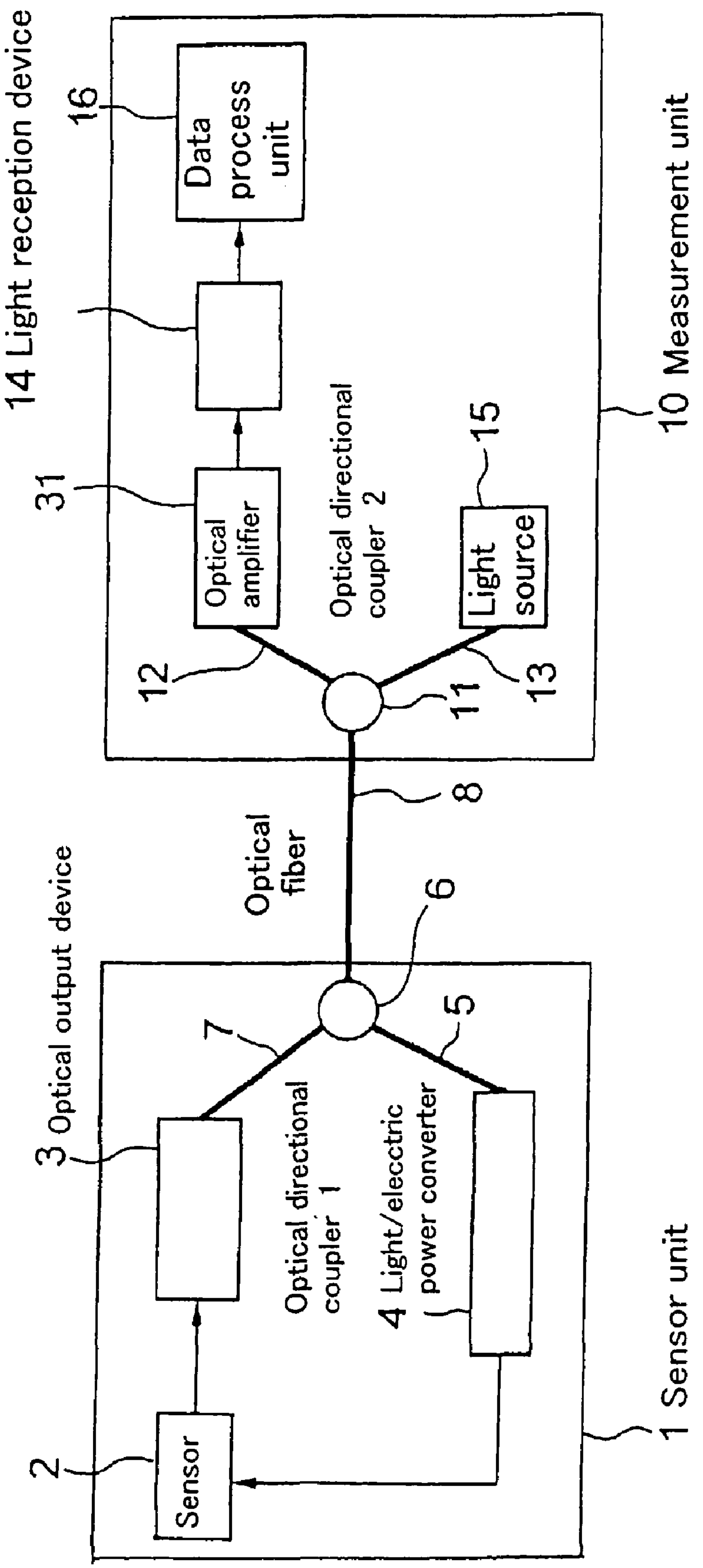
FIG. 13 is a structural view showing an optical power supply type sensing system according to an eleventh embodiment of the present invention.

FIG. 13 is a structural view of an optical power supply type sensing system showing an eleventh embodiment of the present invention.

In the embodiment shown in FIG. 13, an optical amplifier 31 is arranged between the second optical directional coupler and the light reception device 14 of the first embodiment according to the present invention shown in FIG. 1. In other words, the intensity of signal light to be input to the light reception device is amplified by an optical amplifier 31. For example, the optical amplifier 31 comprises an Er-dope fiber and an excitation light source (e.g. wavelength 1488 nm). In this case, the principal that, when an excitation light is irradiated to the Er-dope fiber, transmission signals of 1550 nm band is amplified is utilized. Other conditions are the same as the first embodiment of the present invention.

Twelfth Embodiment

Figure 14:
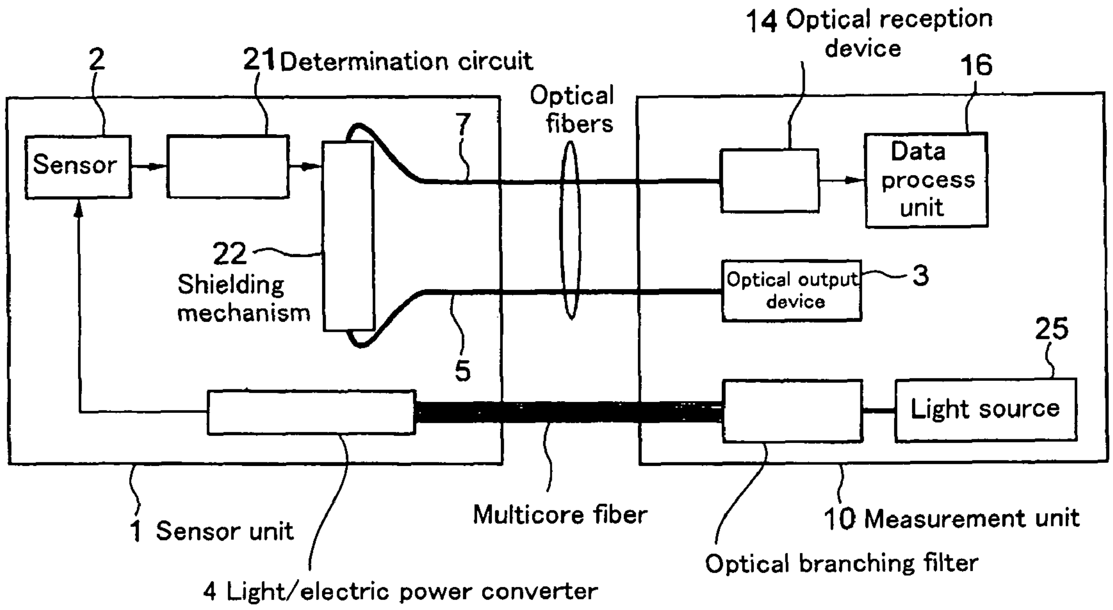
FIG. 14 is a structural view showing an optical power supply type sensing system according to a twelfth embodiment of the present invention.
Figure 15:
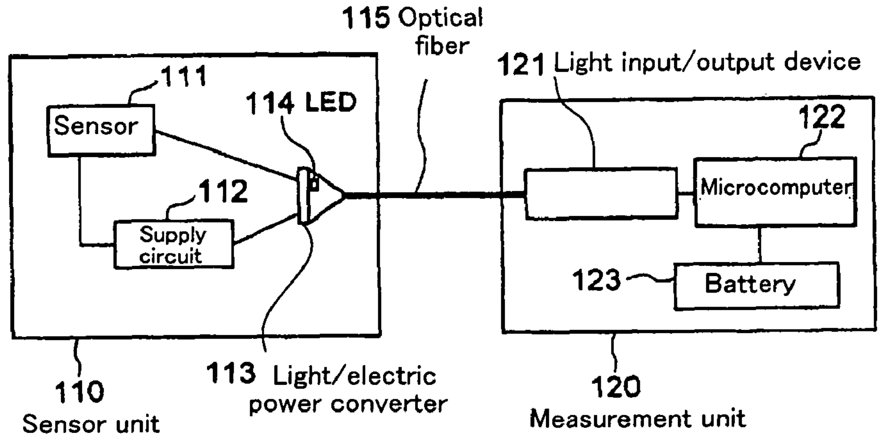
FIG. 15 (PRIOR ART)
FIG. 15 is a structural view showing a conventional optical power supply type sensing system.

FIG. 14 is a structural view of an optical power supply type sensing system showing a twelfth embodiment according to the present invention.

In the embodiment shown in FIG. 14, a multicore fiber is used in the fifth embodiment of the present invention shown in FIG. 5. The multicore optical fiber is used for the optical fiber between the light/electric power converter and the light source. In that case, instead of using an optical branching filter, an output from a plurality of light sources may be input to the multicore optical fiber. Other conditions are the same as the fifth embodiment of the present invention.

What is claimed is:

1. An optical power supply sensing system comprising:

a sensor unit including a light/electric power converter for converting light to electric power and a sensor for measuring physical quantity;

a measurement unit including a light source for supplying light energy and a light reception device for receiving optical data;

an optical output device mounted to said measurement unit;

a first optical fiber which is optically coupled to said optical output device and is arranged in said sensor unit;

a second optical fiber which is optically coupled to said optical output device and is arranged in said sensor unit;

a light shielding mechanism which is mounted between one end of said first optical fiber and one end of said second optical fiber in said sensor unit, for selecting a shielding light or a penetrating light of the light transmitted from said first optical fiber to said second optical fiber;

a determination circuit for controlling the shielding light or the penetrating light of said light shielding mechanism based on the output of said sensor; and a third optical fiber for connecting a light reception area of said light/electric power converter to said light source.

2. An optical power supply type sensing system comprising:

a sensor unit including a light/electric power converter for converting light to electric power and a sensor for measuring physical quantity; and a measurement unit including a light source for supplying light energy and a light reception device for receiving optical data;

an optical output device mounted to said measurement unit;

a first optical fiber which is optically coupled to said optical output device and is positioned in said sensor unit;

a second optical fiber which is optically coupled to said optical output device and is positioned in said sensor unit;

a wavelength conversion mechanism which is connected between one end of said first optical fiber and one end of said second optical fiber and converts the light transmitting from said first optical fiber to said second optical fiber;

a determination circuit for controlling wavelength of said wavelength conversion mechanism based on the output of said sensor; and a third optical fiber for connecting a light reception area of said light/electric power converter and said light source.

3. The optical power supply type sensing system according to claim 1 or claim 2, wherein said first optical fiber is connected to a first input/output port of said optical directional coupler in said sensor unit, said second optical fiber is connected to a second input/output port of said optical directional coupler in said sensor unit, and one end of said third optical fiber is connected to a third input/output port of said optical directional coupler, and another end of said third optical fiber is led out to said measurement unit.

4. The optical power supply type sensing system according to claim 1, further comprising:

a modulator for sending control signals to said light source and allowing said light source to output optical control signals to said third optical fiber; and a demodulator for demodulating the control signals output from said light/electric power converter based on said optical control signals to output demodulated signals to said determination circuit.

5. The optical power supply type sensing system according to claim 2, further comprising:

a modulator for sending control signals to said light source and allowing said light source to output optical control signals to said third optical fiber; and a demodulator for demodulating the control signals output from said light/electric power converter based on said optical control signals to output demodulated signals to said determination circuit.

6. The optical power supply type sensing system according to claim 3, further comprising:

a modulator for sending control signals to said light source and allowing said light source to output optical control signals to said third optical fiber; and a demodulator for demodulating the control signals output from said light/electric power converter based on said optical control signals to output demodulated signals to said determination circuit.

7. The system of claim 1, wherein a plurality of said sensor units are arranged in said optical power supply type sensing system, and the plurality of sensor units are connected to one said measurement unit via fourth optical fiber.

8. The system of claim 2, wherein a plurality of said sensor units are arranged in said optical power supply type sensing system, and the plurality of sensor units are connected to one said measurement unit via fourth optical fiber.

* * * * *